United States Patent
Navarro

(10) Patent No.: US 11,310,245 B2
(45) Date of Patent: Apr. 19, 2022

(54) INDICATOR OF COMPROMISE CALCULATION SYSTEM

(71) Applicant: T-Mobile USA, Inc., Bellevue, WA (US)

(72) Inventor: Ismael Navarro, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 194 days.

(21) Appl. No.: 15/876,822

(22) Filed: Jan. 22, 2018

(65) Prior Publication Data

US 2019/0230098 A1 Jul. 25, 2019

(51) Int. Cl.
*H04L 29/06* (2006.01)
*G06F 21/55* (2013.01)
*G06F 16/907* (2019.01)

(52) U.S. Cl.
CPC ........ *H04L 63/1416* (2013.01); *G06F 16/907* (2019.01); *G06F 21/55* (2013.01); *H04L 63/1433* (2013.01)

(58) Field of Classification Search
CPC ............. H04L 63/1416; H04L 63/1433; G06F 16/907; G06F 21/55; H06F 21/577
USPC .......................................................... 726/22
See application file for complete search history.

(56) References Cited

U.S. PATENT DOCUMENTS

| 2016/0065599 A1* | 3/2016 | Hovor | H04L 67/20 726/23 |
|---|---|---|---|
| 2016/0232358 A1* | 8/2016 | Grieco | G06F 21/577 |
| 2020/0344248 A1* | 10/2020 | De Jesus | G06F 21/552 |

\* cited by examiner

*Primary Examiner* — Jeffrey C Pwu
*Assistant Examiner* — Nega Woldemariam
(74) *Attorney, Agent, or Firm* — Han Santos, PLLC

(57) ABSTRACT

This disclosure describes techniques for calculating a vulnerability score for a malicious threat based on Indicator of Compromise (IoC) metadata retrieved from a computing device or underlying network. Further, an Indicator of Compromise (IoC) Calculation (IoC-C) system is described that may monitor a client interaction on a computing device, and further identify IoC metadata that may relate to a malicious threat. The IoC-C system may further generate a vulnerability score that numerically quantifies a risk that the malicious threat poses to the computing device or underlying network. The vulnerability score may account for environmental criteria that mitigate an effect of the malicious threat. The IoC-C system may also generate a reporting data packet that includes an informational message identifying a potential risk posed by a malicious threat, or a response protocol that dynamically prevents, mitigates or quarantines an effect of the malicious threat on a computing device or underlying network.

20 Claims, 5 Drawing Sheets

INDICATOR OF COMPROMISE CALCULATION SYSTEM

BACKGROUND

Present day, administrators of telecommunications networks and enterprise networks are facing an ever-increasing challenge to prevent and mitigate an impact of malicious activity on computing devices and underlying network. Intrusion detection system and anti-virus software system can provide some level of protection from malware intrusion; however, these protections are best suited to mitigate the effect of malicious activity once an intrusion is underway or has already occurred.

In some cases, administrators may look for early signs of malicious activity by monitoring for Indicators of Compromise (IoC). An IoC may be an artifact observed in system log entries or data files that indicate potential malicious activity or network intrusion that is imminent, currently underway, or has already occurred. While IoCs may provide an administrator with forensic evidence that malicious activity is imminent, is underway, or has already occurred, IoCs lack sufficient transparency to quantify the severity that a particular instance of malicious activity may have on a computing device or underlying network. Thus, without first understanding the severity of each instance of malicious activity, use of IoC data alone may be insufficient to support an administrator in prioritizing use of limited security resources for protecting a computing device or underlying network from the most severe malicious activity.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
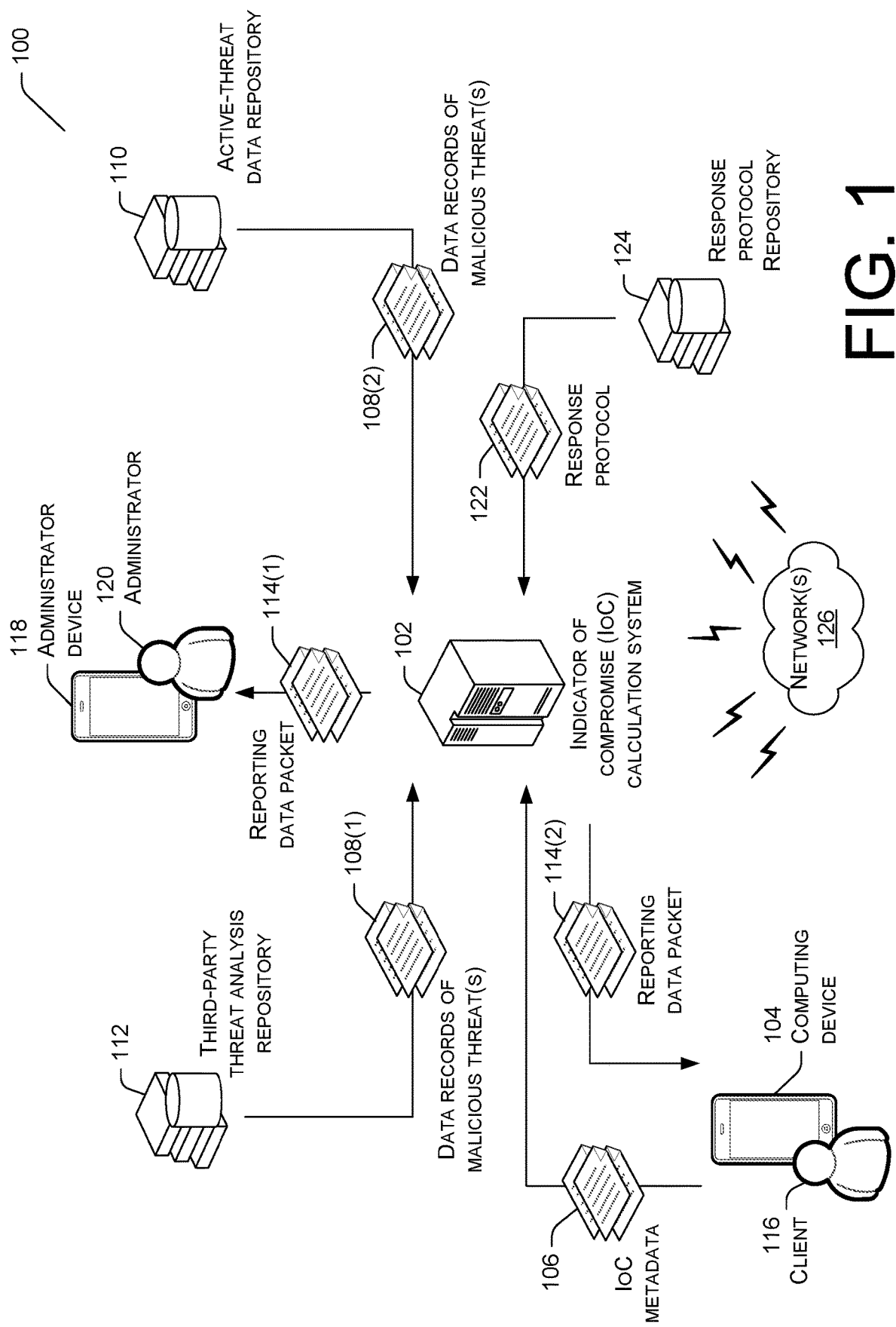
FIG. 1 illustrates a schematic view of a computing environment that facilitates an Indicator of Compromise Calculation (IoC-C) system.

This disclosure describes techniques for calculating a vulnerability score for a malicious threat based on Indicator of Compromise (IoC) metadata retrieved from a computing device or underlying network. More specifically, an Indicator of Compromise Calculation (IoC-C) system is described that may monitor a client interaction performed on a computing device, and further identify IoC metadata that may relate to a malicious threat. In various examples, the IoC metadata may include virus signatures, Internet Protocol (IP) addresses, email address, an indication of a service configuration change, an indication of a data file being deleted, registry keys, file hashes (i.e., MD5 hashes), or Hyper Text Transfer Protocol (HTTP) user agents.

The IoC-C system may use the IoC metadata to identify a malicious threat from data records in a data repository native to the IoC-C system, or a third-party data repository. In a non-limiting example, a malicious threat may comprise of malicious activity that is intended to gain unprivileged access to client data or network data, unprivileged access to control data of a computing device or underlying network, unprivileged attempt to change service configuration files, or an unprivileged deletion of data files associated with the computing device or underlying network.

In response to identifying a malicious threat, the IoC-C system may further generate a vulnerability score that numerically quantifies a risk that the malicious threat may pose to the computing device, or underlying network. The vulnerability score may account for the severity of the malicious threat along with any preventative or mitigating measures employed by the computing device or underlying network. For example, the IoC-C system may identify a malicious threat configured to infiltrate a computing device via a particular Internet Protocol (IP) address. In this example, the IoC-C system may mitigate the effect of the malicious threat by blocking access to the particular IP address. In doing so, the IoC-C system may assign a relatively low-risk vulnerability score for the malicious threat on the basis that access to the computing device is blocked.

Further, the IoC-C system may generate a reporting data packet for transmission to an administrator of the IoC-C system, or an operator of the computing device, based on the level of risk posed by a malicious threat. The content of the reporting data packet may be based at least in part on information associated with the malicious threat, the corresponding vulnerability score. In one example, the reporting data packet may include an informational message identifying the potential risk posed by a malicious threat. In another example, the reporting data packet may include a response protocol that is configured to protect a computing device or underlying network against the malicious threat, mitigate an effect of the malicious threat, quarantine files infiltrated by the malicious threat, or any combination thereof.

More specifically, this disclosure describes an IoC-C system that is configured to monitor a client interaction on a computing device and further identify IoC metadata that may be associated with one or more malicious threats. The IoC-C system may monitor computing devices operating on a telecommunications network or within an enterprise network. In some examples, the IoC-C system may use an IoC monitoring list to identify IoC metadata on a computing device. The IoC monitoring list may include a listing of IoC metadata that corresponds to malicious threats that have been previously identified by the IoC-C system. The IoC metadata may relate to malicious threats that are currently active or have expired. By including active and expired malicious threats, the IoC monitoring list enables the IoC-C system to monitor for traces of active malicious threats that relate to derivatives of malicious threats that have expired.

In various examples, the IoC-C system may monitor a client interaction on a computing device on a continuous basis, per a predetermined schedule, or in response to a triggering event. The predetermined schedule may be set by an administrator of the IoC-C system and may correspond to any time interval, such as 5 minutes, 1 hour, 2 hours, and/or so forth. Further, the triggering event may correspond to receipt of a message indicating that a malicious threat has been identified as active within a telecommunications network, enterprise network, or an alternate third-party network. In this way, the IoC-C system may retrieve IoC metadata from a computing device based at least in part on the instance of IoC metadata being identified within the IoC monitoring list.

In response to retrieving IoC metadata from the computing device, the IoC-C system may employ one or more trained machine learning models to analyze the IoC metadata relative to previously identified malicious threats. The analysis is intended to identify data patterns between the IoC metadata and data records of malicious threats previously encountered by the IoC-C system, or by third-party data intelligence agencies.

The IoC-C system may retrieve data records of a previously identified malicious threat from a data repository maintained by the IoC-C system, such as an active-threat data repository, or from a data repository associated with a third-party, such as a data intelligence agency. In a non-limiting example, each data record may include information relating to a malicious threat, such as, but not limited to, a point-in-time that the malicious threat was first reported active (i.e., reported active by the IoC-C system or any other third-party computing device or underlying network), a time-period for which the malicious threat is expected to remain active, IoC metadata associated with the malicious threat, and an impact of the malicious threat on a computing device or underlying network. In some examples, the IoC-C system may supplement a malicious threat data record, stored within the active-threat data repository, with additional information from a third-party data repository.

In various examples, the IoC-C system may maintain data records for malicious threats within an active-threat data repository for a period of time up to the expiration date of the malicious threat. In doing so, the IoC-C system may analyze IoC metadata retrieved from a computing device or underlying network with malicious threats that remain active. In one example, once an expiration date for a malicious threat has passed, the IoC-C system may remove a corresponding data record from the active-threat data repository. In some examples, the IoC-C system may move the data record to another data repository, such as a historical-threat data repository native to the IoC-C system. The historical-threat data repository may store data records associated with malicious threats that have been previously reported as active by the IoC-C system, but have since expired. A benefit of maintaining a historical-threat data repository is evident when the IoC-C system is unable to identify a data record for a malicious threat in the active-threat data repository or a third-party data repository. The historical-threat data repository provides an additional data repository that may be used to capture an active derivative of a malicious threats that has expired.

The IoC-C system may calculate the expiration date of a malicious threat based on data records from the active-threat data repository or a third-party data repository. For example, the IoC-C system may retrieve a data record associated with a malicious threat that identifies a point-in-time that the malicious threat was first reported active, and a time-period for which the malicious threat is expected to remain active. Thus, the IoC-C system may determine an expiration date for the malicious threat relative to a current point-in-time. In some cases, a data record for a malicious threat may not include a time-period for which the malicious threat is expected to remain active. This may occur for malicious threats that are difficult to mitigate, quarantine, or protect against. In these instances, the expiration date of malicious threat may remain undefined.

Moreover, the IoC-C system may determine whether IoC metadata retrieved from a computing device or underlying network, relates to a malicious threat. More specifically, the IoC-C system may use one or more trained machine learning models to generate a similarity score that numerically quantifies a correlation of IoC metadata with a data record of a malicious threat. The similarity score may be alpha-numeric (i.e., 0 to 10, or A to F), a descriptive expression (i.e., low, medium, or high), based on color (i.e., red, yellow, or green), or any other suitable scale that reflects a similarity between the IoC metadata and a malicious threat. In some examples, the IoC-C system may employ a Levenshtein distance to calculate the similarity score. The Levenshtein distance is a string metric for determining a similarity between IoC metadata and data records of a malicious threat.

The IoC-C system may calculate similarity scores using data records of malicious threats from an active-threat data repository, a third-party data repository, or a combination thereof. An administrator of the IoC-C system may select one of the active-threat data repository or third-party data repository, or a combination of both. Alternatively, IoC-C system may selectively import data records of malicious threats from a third-party data repository into the active-threat data repository, and generate similarity scores based on data records stored with the active-threat data repository.

In another example, the IoC-C system may selectively generate similarity scores for malicious threats stored within the historical-threat data repository. Consider an analysis of IoC metadata whereby the IoC-C system captures IoC metadata identified on an IoC monitoring list, and further generates similarity scores for data records of malicious threats stored within the active-threat data repository or the third-party data repository. In this example, the IoC-C system may be unable to identify a data record for a malicious threat with a sufficient degree of similarity to the IoC metadata. In these instances, the IoC-C system may selectively retrieve data records of historical malicious threats from the historical-threat data repository native to the IoC-C system. The purpose of doing so is to capture any derivatives of malicious threats were previously active and have now expired. In some examples, malicious threats that have expired may have been modified and recast in a derivative form. Since the IoC monitoring list maintains a list of IoC metadata that is related to active and expired malicious threats, it is likely that IoC metadata captured by the IoC-C system (i.e., based on the IoC metadata being identified on the IoC monitoring list) will correlate with at least one historical malicious threat, despite a lack of correlation with data records from an active-threat data repository or a third-party data repository.

It is noteworthy that since a calculation of a similarity score is based on a correlation of IoC metadata with a data record of one malicious threat, the IoC-C system is configured to generate multiple similarity scores for one set of IoC metadata, based on correlating the IoC metadata with multiple malicious threats.

Moreover, in response to calculating a similarity score for IoC metadata relative to one or more malicious threats, the IoC-C system may further determine whether the IoC metadata does in fact relate to one of the malicious threats. For example, the IoC-C system may compare a similarity score for the IoC metadata relative to a malicious threat to a predetermined similarity threshold. The predetermined similarity threshold may be set by an administrator of the IoC-C system, and may indicate a threshold level of similarity above which the IoC-C system may infer than the IoC metadata is associated with the malicious threat. Thus, the IoC-C system may determine that the IoC metadata is related to a particular malicious threat based on the corresponding similarity score being greater than or equal to the predetermined similarity threshold. Further, it follows that the IoC-C system may infer that the IoC metadata does not related to a particular malicious threat in response to the similarity score being less than the predetermined similarity threshold.

In response to identifying a malicious threat, the IoC-C system may perform a threat analysis of how the malicious threat will likely infiltrate and affect a computing device or underlying network. In one example, the IoC-C system may retrieve and analyze data records associated with the malicious threat (i.e., from an active-threat data repository or third-party data repository) to determine whether the malicious threat is likely to gain unprivileged access to client data or network data, unprivileged access to control data of a computing device or underlying network, unprivileged attempt to change service configuration files, or an unprivileged deletion of data files associated with the computing device or underlying network. In some examples, an administrator of the IoC-C system may designate each form of malicious activity, noted above, with a threat-severity score. A threat-severity score may be alpha-numeric (i.e., 0 to 10, or A to F), a descriptive expression (i.e., low, medium, or high), based on color (i.e., red, yellow, or green), or any other suitable scale that reflects a severity of a malicious threat. Further, an administrator of the IoC-C system may designate a threat-severity score that relates to a median severity-level of malicious activity. In this way, the IoC-C system may dynamically adjust the threat-severity score of a malicious threat by comparing the impact of the malicious threat itself, with the median severity-level of the underlying malicious activity.

In a non-limiting example, an administrator may designate a malicious activity relating to unprivileged access to control data of a computing device with a threat-severity score of 5 on a scale of 1 to 10, with 10 being most-severe. Independently, the IoC-C system may identify a malicious threat on a computing device that accesses control data of computing device, and in doing so, further effects performance of other computing devices and/or underlying network. Thus, the IoC-C system may determine that the severity-level of the malicious threat is greater than a median severity-level of the underlying malicious activity (i.e., accessing control data of a computing device), and further adjust the median-level threat-severity score of 5 to a higher score on the basis that the malicious activity poses a greater than median-level threat to the computing device. The criteria by which the IoC-C system may automatically adjust a threat-severity score may be designated by an administrator of the IoC-C system.

Further, the IoC-C system may perform a mitigation analysis of environmental criteria associated with the computing device or underlying network to identify environmental criteria that may mitigate an effect of the malicious threat. In one non-limiting example, a computing device may be configured to prevent users from accessing service configuration files associated with an operating system or network service. Thus, if the threat analysis determines that a malicious threat is likely to infiltrate a computing device and change one or more service configuration files, the mitigation analysis may negate at least some of the threat, on the basis that the computing device is configured to prevent users, and presumably the malicious threat, from accessing service configuration files.

In another non-limiting example, a computing device may be configured to prevent users from accessing a particular IP address that has been historically associated with malicious activity. In this example, the IoC-C system may identify a malicious threat (i.e., based on similarity score of IoC metadata), perform a threat analysis that determines that the malicious threat is likely to direct users to the particular IP address, and further perform a mitigation analysis that negates at least some of the threat on the basis that the computing device has been configured to prevent users, and presumably the malicious threat, from accessing the particular IP address.

In various examples, a mitigation analysis may selectively analyze various environmental criteria of a computing device or underlying network, including but not limited to, preventing users from bypassing a communication protocol (i.e., Wi-Fi) to access computing device or network services, preventing client access to particular domains or IP addresses, or restricting access to system or network configuration files.

Having performed a threat analysis and a mitigation analysis, the IoC-C system may generate a vulnerability score that numerically quantifies a risk associated with the malicious threat on the computing device or the underlying network. More specifically, the vulnerability score may numerically combine the threat-severity score associated with a malicious threat and any identified environmental criteria that may mitigate an effect of the malicious threat. The vulnerability score may be alpha-numeric (i.e., 0 to 10, or A to F), a descriptive expression (i.e., low, medium, or high), based on color (i.e., red, yellow, or green), or any other suitable scale that reflects a vulnerability of a computing device or underlying network by a malicious threat.

In a first non-limiting example, the IoC-C system may detect a client interaction that involves a computing device accessing a domain that causes a plethora of unsolicited marketing elements to inundate a user interface of the computing device. In doing so, the IoC-C system may determine that the malicious threat poses a low risk to the computing device or underlying network, and in doing so, assign a low threat-severity score to the malicious threat on the basis that the malicious threat does not cause a loss of data, does not cause a loss of access controls (i.e., aside from hampering client interaction on the computing device), nor does the automatically malicious activity spread to other computing devices communicatively connected to the computing device via the underlying network. The low threat-severity score may correspond to 3 on a scale of 1 to 10, with 10 being most-severe. The IoC-C system may further determine that the computing device or underlying network does not have any environmental criteria that could mitigate the effect of the malicious threat. Thus, the IoC-C system may determine that the vulnerability score for the malicious threat is "low" on a relative vulnerability scale of "low" to "high," or 3 on a scale of 1 to 10, which is comparably similar to the threat-severity score.

In a second non-limiting example, the IoC-C system may detect a client interaction that involves a change to a system configuration file on a computing device. In this example, the IoC-C system may determine that the IoC metadata (i.e., change to a system configuration file) is associated with a malicious threat that causes a loss of data on the computing device, a loss of access controls on the computing device, or a combination of both. In doing so, the IoC-C system may assign a "high" threat-severity score to the malicious threat on the basis of the malicious activity noted above. The IoC-C system may further determine that the computing device does not have any environmental criteria that could mitigate an effect of the malicious threat. Thus, the IoC-C system may determine that the vulnerability score for the malicious threat is "high" on a relative vulnerability scale of "low" to "high," which is comparably consistent with the threat-severity score.

In a third non-limiting example, the IoC-C system may detect a client interaction to access a computing device by bypassing a communication channel, such as Wi-Fi, associated with the underlying network. In doing so, the IoC-C system may determine that the malicious threat poses a high risk to the computing device or underlying network, and in doing so, assign a high threat-severity score, such as 7 on a scale of 1 to 10, with 10 being most-severe. The IoC-C system may further determine that the underlying network has blocked an ability to bypass a communication channel, thereby negating the effect posed by the malicious threat. In this example, the IoC-C system may determine that the vulnerability score for the malicious threat is "low" on a relative vulnerability scale of "low" to "high," or corresponds to a numerical value less than 7 (i.e., threat-severity score for the malicious threat) on a scale of 1 to 10, on the basis that the environmental criteria of blocking an ability to bypass a communication channel negates the threat-severity associated with the malicious threat.

In some examples, a vulnerability score may further reflect a degree of confidence in an underlying threat analysis or environmental criteria. For example, the IoC-C system may increase the vulnerability score of a malicious threat based on a lack of confidence in the reliability of information that supports an underlying threat analysis or environmental criteria. Further, the IoC-C system may leave the vulnerability score of a malicious threat unchanged, based on a high degree of confidence in the information that supports the underlying threat analysis and environmental criteria. An administrator of the IoC-C system may set criteria to determine a reliability of information. Reliability may be based on a reputation of a third-party resource, a relative newness of a malicious threat, a sparsity or wealth of information within a data record associated with a malicious threat, or any combination thereof.

In a first non-limiting example, the IoC-C system may retrieve a data record for a malicious threat from a data repository associated with a reputable third-party. In this example, the IoC-C system may associate a high degree of confidence in the vulnerability score based on an inference that the information from the reputable third-party is reliable. In doing so, the IoC-C system may leave the vulnerability score for the malicious threat, unchanged.

Alternatively, the IoC-C system may retrieve a data record from a less reputable, or relatively unknown third party. In this second non-limiting example, the IoC-C system may infer that information from the less reputable or relatively unknown third-party is less reliable. In doing so, the IoC-C system may increase the vulnerability score of the malicious threat proportional to the inferred lack of reliability.

In a third non-limiting example, the IoC-C system may retrieve a sparsely populated data record for a malicious threat that has only been active for a short-period of time. In this third example, the IoC-C system may infer a low degree of confidence in the vulnerability score based on the sparsely populated data record. In this third example, the IoC-C system may increase the vulnerability score for the malicious threat proportional to the lack of confidence in the underlying lack of information.

Additionally, the IoC-C system may generate a reporting data packet for transmission to an administrator of the IoC-C system or an operator of computing device from which the IoC metadata was derived. The content of the reporting data packet may be based at least in part on information associated with the malicious threat and the corresponding vulnerability score. For example, an administrator of the IoC-C system may set a value for a predetermined vulnerability threshold to distinguish between generating a first reporting data packet that transmits an informational message identifying a potential risk posed by a malicious threat, or a second reporting data packet that transmits a response protocol for dynamically protecting, mitigating, or quarantining an effect of a malicious threat on the computing device or underlying network.

In one non-limiting example, the IoC-C system may determine that the vulnerability score for a malicious threat is less than the predetermined vulnerability threshold. In doing so, the IoC-C system may infer that the malicious threat poses a relatively low risk to the computing device or underlying network. Thus, the IoC-C system may generate a reporting data packet that includes an informational message identifying a potential risk posed by the malicious threat.

In another non-limiting example, the IoC-C system may determine that the vulnerability score for the malicious threat is greater than or equal to the predetermined vulnerability threshold. In doing so, the IoC-C system may infer that the malicious threat poses a relatively high risk to the computing device or underlying network. Thus, the IoC-C system may generate a reporting data packet that includes a response protocol configured to dynamically protect, mitigate, or quarantine an effect of the malicious threat on the computing device or underlying network.

In various examples, the IoC-C system may be used by insurance agencies, actuaries, or compliance officers auditing security information and event management systems of an enterprise network. In each of these instances, the IoC-C system may provide personnel with forensic evidence of IoC metadata used to identify malicious threats that threatened to impact a computing device or underlying network. Since the IoC-C system may generate a vulnerability score that numerically combines a severity of a malicious threat with mitigating environmental criteria, an administrator of the IoC-C system may present compliance officers with a report of prioritized use of security resources used to protect the computing device or underlying network from the most severe malicious activity. The report may further detail an impact of environmental criteria used to mitigate some malicious activity, while also highlighting some malicious threats (i.e., highest vulnerability scores) that may require further preventative or mitigation measures.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of a computing environment 100 that facilitates an Indicator of Compromise Calculation (IoC-C) system 102. In the illustrated example, the IoC-C system 102 may be configured to monitor client interaction(s) performed on a computing device 104 operating on an underlying network. The underlying network may correspond to a telecommunications network or an enterprise network. In this example, the IoC-C system 102 may identify and retrieve IoC metadata 106 from the computing device 104 based at least in part on a IoC monitoring list maintained by the IoC-C system 102. The IoC monitoring list may include a listing of IoC metadata 106 that corresponds to malicious threats that have been previously identified by the IoC-C system 102.

The IoC-C system 102 may monitor the computing device 104 for IoC metadata 106 on a continuous basis, per a predetermined schedule, or in response to a triggering event. The triggering event may correspond to receipt of a message indicating that a malicious threat has been identified as active within an underlying network.

In the illustrated example, the IoC-C system 102 may analyze the IoC metadata 106 retrieved from the computing device 104 to determine whether the IoC metadata 106 relates to a malicious threat. More specifically, the IoC-C system 102 may retrieve data records of malicious threats 108 from an active-threat data repository 110, a third-party data repository 112, or a combination of both. In some examples, the active-threat data repository 110 may be maintained by the IoC-C system 102, or by a service provider on behalf of the IoC-C system 102. Additionally, the third-party data repository 112 may be maintained by, or on behalf of a third-party, such as a data intelligence agency.

Moreover, in response to identifying a malicious threat, the IoC-C system 102 may further generate a vulnerability score that numerically quantifies a risk that the malicious threat may pose to the computing device 104, or underlying network. In doing so, the IoC-C system 102 may generate a reporting data packet 114 for transmission to the computing device 104 of the client 116 or an administrator device 118 of an administrator 120 of the IoC-C system 102, or a combination of both.

In one example, the reporting data packet 114 may include an informational message that identifies the potential risk posed by the malicious threat. In this example, the reporting data packet 114 may include computer executable instructions that dynamically present the informational message on a user interface of the computing device 104 associated with the client 116 or an administrator device 118 associated with an administrator 120 of the IoC-C system 102.

In another example, the reporting data packet 114 may include a response protocol 122 that corresponds to computer executable instructions that dynamically protect, mitigate, or quarantine an effect of a malicious threat on the computing device 104 or underlying network. The IoC-C system 102 may retrieve the response protocol 122 from a response protocol data repository 124 that is maintained by the IoC-C system 102, or by a service provider on behalf of the IoC-C system 102. In this example, the reporting data packet 114 may further include computer executable instructions that dynamically execute the response protocol 122 to protect, mitigate, or quarantine an effect of a malicious threat on the computing device 104 or underlying network.

In the illustrated example, a telecommunications service provider may provide telecommunications and data communications in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. The computing environment 100 may include a core network that may provide telecommunication and data communication services to multiple computing devices, such as a 3G-compatible computing device and an LTE an LTE-compatible computing device, collectively referred to as computing device(s). Computing device(s) may include computing device 104 and administrator device 118 and may correspond to any sort of electronic device operating on the telecommunications network, such as a cellular phone, a smart phone, a tablet computer, an electronic reader, a media player, a gaming device, a personal computer (PC, a laptop computer), etc. The computing device(s) may have a subscriber identity module (SIM), such as an eSIM, to identify the respective electronic device to a telecommunications service provider network (also referred to herein as "telecommunications network").

Additionally, the IoC-C system 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the computing device 104 and administrator device 118 via one or more network(s) 126. The one or more network(s) 126 may include public networks such as the Internet, private networks such as an institutional and/or personal intranet, or some combination of private and public networks. The one or more network(s) 126 can also include any type of wired and/or wireless network, including but not limited to local area network (LANs), wide area networks (WANs), satellite networks, cable networks, Wi-Fi networks, Wi-Max networks, mobile communications networks (e.g., 3G, 4G, and so forth), or any combination thereof.

Figure 2:
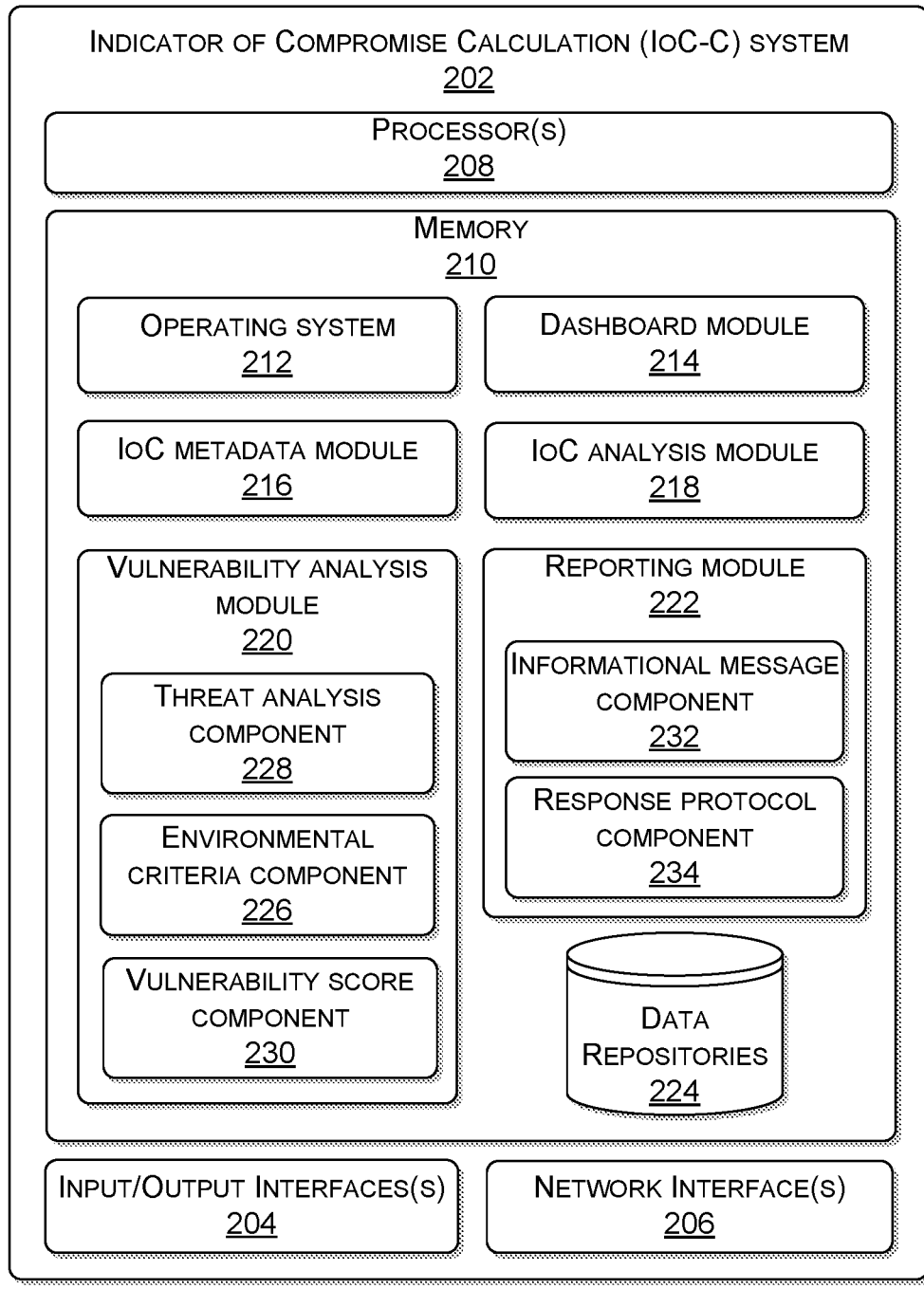
FIG. 2 illustrates a block diagram of various components of an Indicator of Compromise Calculation (IoC-C) system.

FIG. 2 illustrates a block diagram of various components of an Indicator of Compromise Calculation (IoC-C) system. The IoC-C system 202 may include routines, program instructions, objects, and/or data structures that perform particular tasks or implement abstract data types. Further, the IoC-C system 202 may include input/output interface(s) 204. The input/output interface(s) 204 may include any type of output interface known in the art, such as a display (e.g., a liquid crystal display), speakers, a vibrating mechanism, or a tactile feedback mechanism. Input/output interface(s) 204 also include ports for one or more peripheral devices, such as headphones, peripheral speakers, or a peripheral display. Further, the input/output interface(s) 204 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the IoC-C system 202 may include network interface(s) 206. The network interface(s) 206 may include any sort of transceiver known in the art. For example, the network interface(s) 206 may include a radio transceiver that performs the function of transmitting and receiving radio frequency communications via an antenna. In addition, the network interface(s) 206 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the network interface(s) 206 may include wired communication components, such as an Ethernet port or a Universal Serial Bus (USB).

Further, the IoC-C system 202 may include one or more processor(s) 208 that are operably connected to memory 210. In at least one example, the one or more processor(s) 208 may be a central processing unit(s) (CPU), graphics processing unit(s) (GPU), a both a CPU and GPU, or any other sort of processing unit(s). Each of the one or more processor(s) 208 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 208 may also be responsible for executing all computer applications stored in the memory, which can be associated with common types of volatile (RAM) and/or nonvolatile (ROM) memory.

In some examples, memory 210 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 210 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 210 may include an operating system 212, a dashboard module 214, an IoC metadata module 216, an IoC analysis module 218, a vulnerability analysis module 220, a reporting module 222, and one or more data repositories 224. The operating system 212 may be any operating system capable of managing computer hardware and software resources.

The dashboard module 214 may be configured to receive data inputs from an administrator of the IoC-C system 202. In some examples, administrator inputs may include a predetermined schedule for monitoring IoC metadata on a computing device, a predetermined similarity threshold, and a predetermined vulnerability threshold. An administrator may also designate a threat-severity score that relates to a median severity-level of malicious activity.

Further, the dashboard module 214 may facilitate an administrator selection of a source for data records of malicious threats. For example, an administrator may select, via the dashboard module 214, an active-threat data repository, a third-party data repository, or a combination of both. Additionally, an administrator may selectively import, via the dashboard module 214, data records of malicious threats from a third-party data repository into an active-threat data repository. Moreover, an administrator may set criteria to determine a reliability of information that is used to quantify environmental criteria by the environmental criteria component 226.

The IoC metadata module 216 may be configured to monitor a client interaction on a computing device and further identify IoC metadata that may be associated with one or more malicious threats. The IoC metadata module 216 may employ a data mining algorithm to extract relevant metadata, such as words, terms, phrases, quotes, or ratings from a client interaction on a computing device. In various examples, the IoC metadata may include virus signatures, Internet Protocol (IP) addresses, email address, an indication of a service configuration change, an indication of a data file being deleted, registry keys, file hashes (i.e., MD5 hashes), or Hyper Text Transfer Protocol (HTTP) user agents. The IoC metadata module 216 may monitor a client interaction on a computing device on a continuous basis, per a predetermined schedule, or in response to a triggering event. An administrator of the IoC-C system 202 may set the predetermined schedule via the dashboard module 214. Further, the triggering event may correspond to a receipt of a message indicating that a malicious threat has been identified as active.

Further, the IoC metadata module 216 may include an IoC monitoring list to identify IoC metadata. The IoC monitoring list may include a listing of IoC metadata that corresponds to malicious threats that have been previously identified by the IoC-C system. The IoC metadata may relate to malicious threats that are currently active or have expired. By including active and expired malicious threats, the IoC monitoring list enables the IoC-C system to monitor for traces of active malicious threats that relate to derivatives of malicious threats that have expired.

The IoC analysis module 218 may be configured determine whether IoC metadata retrieved from a computing device or underlying network, relates to a malicious threat. More specifically, the IoC analysis module 218 may use one or more trained machine learning models to generate a similarity score that numerically quantifies a correlation of IoC metadata with a data record of a malicious threat. The similarity score may be alpha-numeric (i.e., 0 to 10, or A to F), a descriptive expression (i.e., low, medium, or high), based on color (i.e., red, yellow, or green), or any other suitable scale that reflects a similarity between the IoC metadata and a malicious threat. Further, the IoC analysis module 218 may further determine whether a similarity score is greater than or equal to a predetermined similarity threshold. In doing so, the IoC analysis module 218 may selectively correlate the IoC metadata with a malicious threat.

In the illustrated example, the vulnerability analysis module 220 may further include a threat analysis component 228, an environmental criteria component 226, and a vulnerability score component 230. The threat analysis component 228 may perform a threat analysis of how the malicious threat will likely infiltrate and affect a computing device or underlying network. In one example, the threat analysis component 228 may retrieve and analyze data records associated with a malicious threat (i.e., from an active-threat data repository or third-party data repository) to determine whether the malicious threat is likely to gain unprivileged access to client data or network data, unprivileged access to control data of a computing device or underlying network, unprivileged attempt to change service configuration files, or an unprivileged deletion of data files associated with the computing device or underlying network.

The threat analysis component 228 may further generate a threat-severity score. The threat-severity score may be alpha-numeric (i.e., 0 to 10, or A to F), a descriptive expression (i.e., low, medium, or high), based on color (i.e., red, yellow, or green), or any other suitable scale that reflects a severity of a malicious threat.

Moreover, the environmental criteria component 226 may perform a mitigation analysis of environmental criteria associated with the computing device or underlying network to identify environmental criteria that may mitigate an effect of the malicious threat. More specifically, the mitigation analysis may selectively analyze various environmental criteria of a computing device or underlying network, including but not limited to, preventing users from bypassing a communication protocol (i.e., Wi-Fi) to access computing device or network services, preventing client access to particular domains or IP addresses, or restricting access to system or network configuration files.

Further, the vulnerability score component 230 may generate a vulnerability score that numerically quantifies a risk associated with the malicious threat on the computing device or the underlying network. More specifically, the vulnerability score may numerically combine the threat-severity score associated with a malicious threat and any identified environmental criteria that may mitigate an effect of the malicious threat. The vulnerability score may be alpha-numeric (i.e., 0 to 10, or A to F), a descriptive expression (i.e., low, medium, or high), based on color (i.e., red, yellow, or green), or any other suitable scale that reflects a vulnerability of a computing device or underlying network by a malicious threat.

Additionally, the vulnerability score component 230 may determine whether the vulnerability score is greater than or equal to a predetermined vulnerability threshold. In doing so, the vulnerability score component 230 may selectively generate a reporting data packet for transmission to at least an administrator of the IoC-C system 202.

In some examples, the vulnerability score component 230 may also determine an expiration date of a malicious threat based at least in part on a data record of the malicious threat. In doing so, the vulnerability score component 230 may further cause a data record of the malicious threat to be retained, or deleted within the active-threat data repository in response to determining whether the malicious threat has expired.

In the illustrated example, the reporting module 222 may further include an informational message component 232 and a response protocol component 234. The informational message component 232 may be configured to generate an informational message identifying the potential risk posed by a malicious threat. Further, the informational message component 232 may generate a reporting data packet that includes computer executable instructions that dynamically presents the informational message on a user interface of an administrator device associated with the IoC-C system 202, or a user interface associated with a computing device from which the IoC metadata was derived. In some examples, the informational message component 232 may transmit a reporting data packet to an administrator device of the IoC-C system, the computing device from which the IoC metadata was derived, or a combination of both.

Moreover, the response protocol component 234 may be configured to retrieve a response protocol from a response protocol data repository that is intended to protect a computing device or underlying network. In some examples, the response protocol may protect, mitigate, or quarantine an effect of a malicious threat on a computing device. Additionally, the response protocol component 234 may generate a reporting data packet that includes computer executable instructions that dynamically execute the response protocol on a computing device or underlying network. The response protocol component 234 may transmit a reporting data packet to an administrator device of the IoC-C system, the computing device from which the IoC metadata was derived, or a combination of both.

The data repositories 224 may include an active-threat data repository, a historical-threat data repository, and a response protocol data repository. The active-threat data repository may include data records of malicious threats that have been previously identified by the IoC-C system 202. In some examples, a data record for a malicious threat may be stored within the active-threat data repository for a period of time up to the expiration date of the malicious threat. Each data record may include information relating to a malicious threat, such as, but not limited to, a point-in-time that the malicious threat was first reported active (i.e., reported active by the IoC-C system or any other third-party computing device or underlying network), a time-period for which the malicious threat is expected to remain active, IoC metadata associated with the malicious threat, and an impact of the malicious threat on a computing device or underlying network.

The historical-threat data repository may include data records of malicious threats that have been previously reported as active by the IoC-C system, but have since expired. The response protocol data repository may include one or more response protocols that protect, mitigate, or quarantine an effect of the malicious threat.

Figure 3:
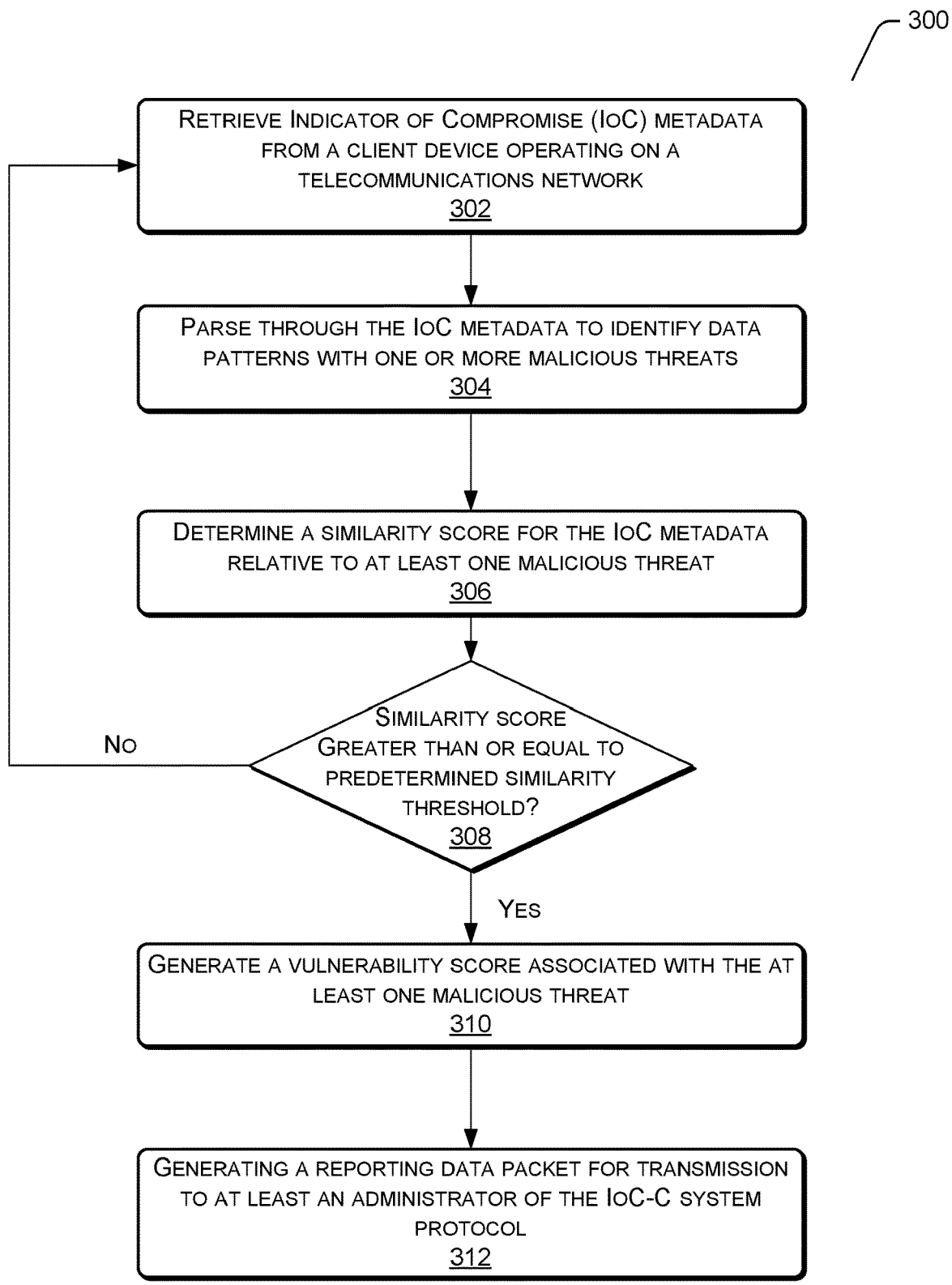
FIG. 3 illustrates a flow diagram of an Indicator of Compromise Calculation (IoC-C) system process for retrieving IoC metadata from a computing device or underlying network, and further identifying a malicious threat that may affect the computing device or underlying network.
Figure 4:
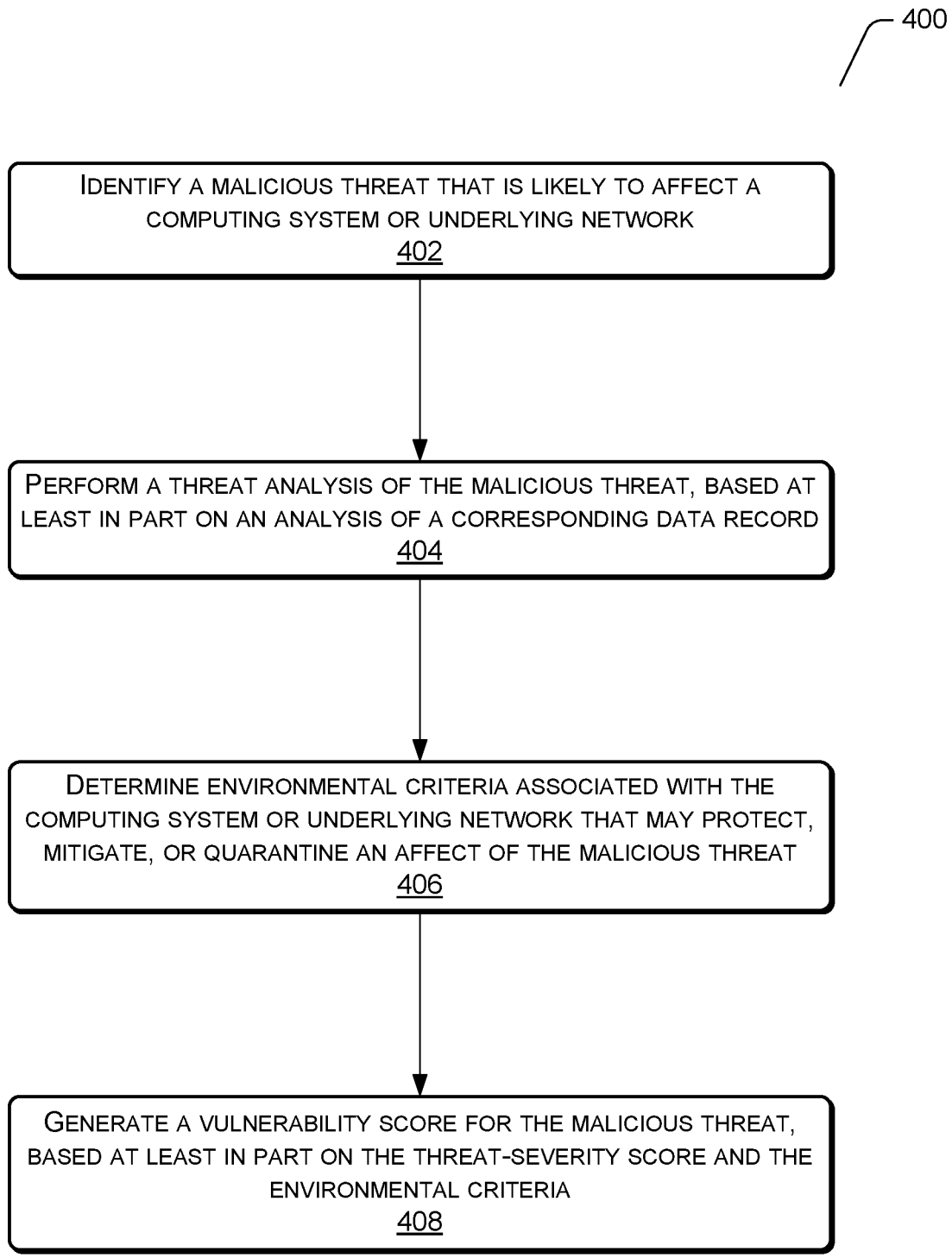
FIG. 4 illustrates a flow diagram of an Indicator of Compromise Calculation (IoC-C) system process for generating a vulnerability score for a malicious threat.
Figure 5:
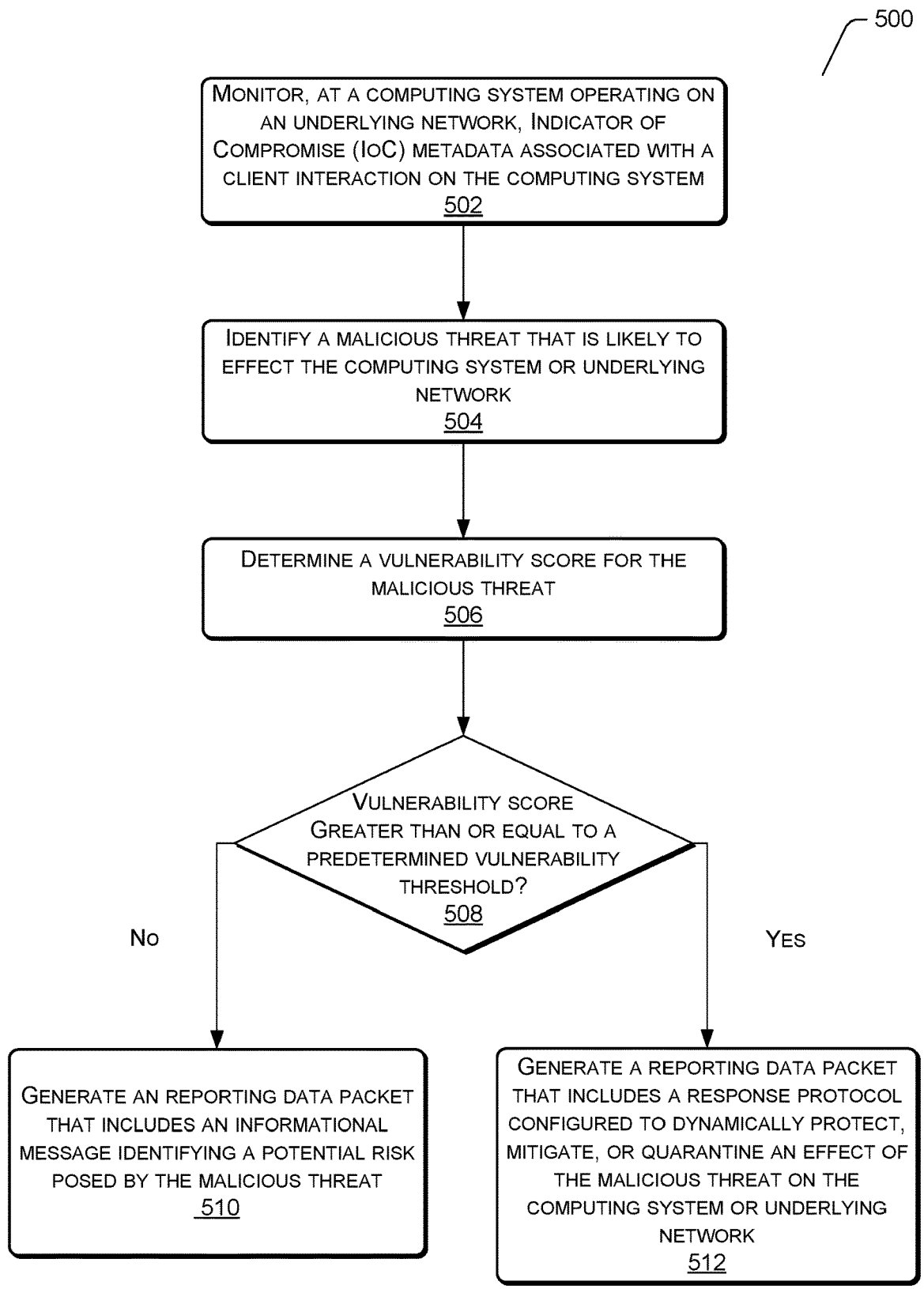
FIG. 5 illustrates a flow diagram of an Indicator of Compromise Calculation (IoC-C) system process for generating reporting data packet for transmission to at least an administrator of the IoC-C system.

FIGS. 3, 4, and 5 present processes 300, 400, and 500 that relate to operations of the Indicator of Compromise Calculation system. Each of processes 300, 400, and 500 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300, 400, and 500 are described with reference to the computing environment 100 of FIG. 1.

FIG. 3 illustrates a flow diagram of an Indicator of Compromise Calculation (IoC-C) system process for retrieving IoC metadata from a computing device or underlying network, and further identifying a malicious threat that may affect the computing device or underlying network. In various examples, the IoC-C system may audit IoC metadata on computing devices operating on a telecommunications network or an enterprise network of an organization.

At 302, the IoC-C system may retrieve Indicator of Compromise (IoC) metadata from a computing device operating on an underlying network. The IoC metadata may include virus signatures, include virus signatures, Internet Protocol (IP) addresses, email address, an indication of a service configuration change, an indication of a data file being deleted, registry keys, file hashes (i.e., MD5 hashes), or Hyper Text Transfer Protocol (HTTP) user agents.

At 304, the IoC-C system may parse through the IoC metadata to identify data patterns between the IoC metadata and one or more malicious threats. In some examples, the IoC-C system may employ one or more trained machine learning models to analyze the IoC metadata. In some examples, IoC-C system may retrieve data records of previously identified malicious threats from a data repository maintained by the IoC-C system, such as an active-threat data repository, or from a data repository associated with a third-party such as a data intelligence agency.

At 306, the IoC-C system may determine a similarity score for the IoC metadata relative to at least one malicious threat. The similarity score may numerically quantify a correlation of IoC metadata with a data record of a malicious threat. It is noteworthy that since a similarity score is based on a correlation of IoC metadata with a data record of one malicious threat, the IoC-C system may generate multiple similarity scores for one set of IoC metadata, based on correlating the IoC metadata with multiple malicious threats.

At 308, the IoC-C system may determine whether the similarity score for the IoC metadata relative to the malicious threat greater than or equal to a predetermined similarity threshold. The predetermined similarity threshold may indicate a threshold level of similarity above which the IoC-C system may infer than the IoC metadata is associated with the malicious threat.

In one example, the IoC-C system may determine that the similarity score for the IoC metadata relative to the malicious threat is less than the predetermined similarity threshold. In this example, the IoC-C system may infer that the IoC metadata does not relate to the malicious threat, and in doing so, return to step 302 and continue retrieving IoC metadata from the computing device.

At 310, the IoC-C system may determine that the similarity score for the IoC metadata relative to the malicious threat is greater than or equal to a predetermined similarity threshold. In this example, the IoC-C system may infer that the IoC metadata relates to the malicious threat. In doing so, the IoC-C system may generate a vulnerability score associated with the malicious threat. The vulnerability score may numerically quantify a risk associated with the malicious threat on the computing device or underlying network. More specifically, the vulnerability score may numerically combine a threat-severity score associated with the malicious threat and any identified environmental criteria that may, protect, mitigate, or quarantine an effect of the malicious threat.

At 312, the IoC-C system may generate a reporting data packet for transmission to at least an administrator of the IoC-C system. The content of the reporting data packet may include an informational message identifying a potential risk posed by the malicious threat, or a response protocol that is configured to protect a computing device or underlying network against the malicious threat, mitigate an effect of the malicious threat, quarantine files infiltrated by the malicious threat, or any combination thereof.

FIG. 4 illustrates a flow diagram of an Indicator of Compromise Calculation (IoC-C) system process for generating a vulnerability score for a malicious threat based on a threat analysis of the malicious threat and environmental criteria associated with the computing device or underlying network. In various examples, the vulnerability score may numerically combine a threat analysis of a malicious threat and environmental criteria that protect, mitigate, or quarantine an effect of the malicious threat.

At 402, the IoC-C system may identify a malicious threat that is likely to affect a computing device or underlying network. In various examples, the IoC-C system may identify the malicious threat based on an analysis of IoC metadata retrieved from the computing device or underlying network, and further determining that a similarity score associated with the IoC metadata and a data record of the malicious threat is greater than or equal to a predetermined similarity threshold.

At 404, the IoC-C system may perform a threat analysis of the malicious threat, based at least in part on an analysis of a data record associated with the malicious threat. In one example, the IoC-C system may retrieve and analyze data records associated with the malicious threat to determine whether the malicious threat is likely to gain unprivileged access to client data or network data, unprivileged access to control data of a computing device or underlying network, unprivileged attempt to change service configuration files, or an unprivileged deletion of data files associated with the computing device or underlying network.

In some examples, the IoC-C system may retrieve a data record of the malicious threat from an active-threat data repository native to the IoC-C system or from a data repository associated with a third-party, such as a data intelligence agency. Each data record may include information relating to a malicious threat, such as, but not limited to, a point-in-time that the malicious threat was first reported active, a time-period for which the malicious threat is expected to remain active, IoC metadata associated with the malicious threat, and an impact of the malicious threat on a computing device or underlying network.

At 406, the IoC-C system may determine environmental criteria associated with the computing device or underlying network that may protect, mitigate, or quarantine an affect of the malicious threat. Environmental criteria may include, but is not limited to, preventing users from bypassing a communication protocol (i.e., Wi-Fi) to access computing device or network services, preventing client access to particular domains or IP addresses, or restricting access to system or network configuration files.

At 408, the IoC-C system may generate a vulnerability score for the malicious threat. In some examples, the vulnerability score may numerically combine the threat-severity score associated with the malicious threat and any identified environmental criteria that protect, mitigate, or quarantine an effect of the malicious threat. Further, the vulnerability score may further reflect a degree of confidence in the underlying threat analysis or environmental criteria. For example, the IoC-C system may increase the vulnerability score of the malicious threat based on a lack of confidence in the reliability of information that supports an underlying threat analysis or environmental criteria.

FIG. 5 illustrates a flow diagram of an Indicator of Compromise Calculation (IoC-C) system process for generating reporting data packet. In some examples, the IoC-C system may transmit the reporting data packet to an administrator of the IoC-C system, an operator of the computing device of which the IoC metadata was derived, or a combination of both.

At 502, the IoC-C system may monitor, at a computing device operating on an underlying network, Indicator of Compromise (IoC) metadata associated with a client interaction on the computing device. In some examples, the IoC-C system may use an IoC monitoring list to identify IoC metadata. The IoC monitoring list may include IoC metadata that corresponds to malicious threats that have been previously identified by the IoC-C system.

Further, the IoC-C system may monitor the computing device and underlying network on a continuous basis, per a predetermined schedule, or in response to a triggering event. The triggering event may correspond to receipt of a message indicating that a malicious threat has been identified within the underlying network or another network.

At 504, the IoC-C system may identify a malicious threat that is likely to affect the computing device or underlying network, based at least in part on determining that a similarity score associated with the IoC metadata and a data record of the malicious threat is greater than or equal to a predetermined similarity threshold. In some examples, the IoC-C system may employ a Levenshtein distance to calculate the similarity score. The Levenshtein distance is a string metric for determining a similarity between IoC metadata and data records of a malicious threat.

At 506, the IoC-C system may determine a vulnerability score for the malicious threat based at least in part on a threat analysis of the malicious threat and environmental criteria associated with the computing device and underlying network. In some examples, the vulnerability score may numerically combine the threat-severity score associated with the malicious threat and any identified environmental criteria that protect, mitigate, or quarantine an effect of the malicious threat.

At 508, the IoC-C system may determine whether the vulnerability score for the malicious threat is greater than or equal to a predetermined vulnerability threshold. An administrator of the IoC-system may set a value for the predetermined vulnerability threshold as a means for determining content a reporting data packet that is transmitted to at least an operator of the IoC-C system.

At 510, the IoC-C system may determine that the vulnerability score for the malicious threat is less than the predetermined vulnerability threshold. In doing so, the IoC-C system may infer that the malicious threat poses a relatively low risk to the computing device or underlying network. Thus, the IoC-C system may generate a reporting data packet that includes an informational message identifying a potential risk posed by the malicious threat.

At 512, the IoC-C system may determine that the vulnerability score for the malicious threat is greater than or equal to the predetermined vulnerability threshold. In doing so, the IoC-C system may infer that the malicious threat poses a relatively high risk to the computing device or underlying network. Thus, the IoC-C system may generate a reporting data packet that includes a response protocol configured to dynamically protect, mitigate, or quarantine an effect of the malicious threat on the computing device or underlying network. More specifically, the reporting data packet may include computer-executable instructions that automatically execute the response protocol on the computing device or underlying network.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under control of one or more processors:
receiving, from a computing device operating on a telecommunications network, Indicator of Compromise (IoC) metadata derived from a client interaction at the computing device via the telecommunications network, the client interaction involving at least one of a change to a systems configuration file or a bypass of a communications channel;
analyzing the IoC metadata to identify data patterns between the IoC metadata and one or more malicious threats;
identifying at least one malicious threat from the one or more malicious threats, based at least in part on analysis of the IoC metadata;
retrieving, from a third-party data repository, a data record associated with the at least one malicious threat, the data record including a first point-in-time that the at least one malicious threat was reported active;
determining, a time-period for which the at least one malicious threat is likely to remain active after the first point-in-time, based at least in part on the data record;
determining a second point-in-time that corresponds to a likely expiration of the at least one malicious threat based at least in part on the first point-in-time and the time-period;
performing a mitigation analysis of environmental criteria associated with the computing device using the data record that is maintained until an expiration of the second point-in-time, the environmental criteria comprising measures that protect, mitigate or quarantine an impact of the at least one malicious threat on the computing device;
determining a vulnerability score that is associated with the at least one malicious threat, wherein the vulnerability score is determined to numerically combine a severity of the at least one malicious threat and mitigating environmental criteria; and
generating reporting data that includes at least the vulnerability score associated with the IoC metadata.

2. The computer-implemented method of claim 1, further comprising:
storing, the data record associated with the at least one malicious threat within an active-threat data repository before the expiration of the second point-in-time, the active-threat data repository including plurality of active-threat threats associated with the telecommunications network.

3. The computer-implemented method of claim 1, further comprising:
retrieving, from a data repository, at least one of a first set of malicious threats that were historically identified within the telecommunications network, or a second set of malicious threats that were historically identified by third-party threat intelligence entities;
generating an IoC monitoring list that includes IoCs that correspond to at least one of the first set of malicious threats or the second set of malicious threats; and
monitoring the computing device on the telecommunications network to identify instances of the IoCs associated with the IoC monitoring list, and
wherein, receiving, from the computing device, the IoC metadata is based at least in part on monitoring the computing device on the telecommunications network.

4. The computer-implemented method of claim 1, further comprising:
monitoring the computing device on the telecommunications network on a continuous basis, per a predetermined schedule, or in response to a triggering event, the triggering event corresponding to message indicating that an instance of a malicious threat has been identified within one of the telecommunications network or an alternate, third-party communications network, and
wherein, receiving the IoC metadata occurs in response to monitoring of the computing device on the telecommunications network.

5. The computer-implemented method of claim 1, further comprising:
generating a similarity score for the IoC metadata by identifying data patterns between the IoC metadata and individual ones of the one or more malicious threats, and wherein, identifying the at least one malicious threat is based at least in part on the similarity score for the at least one malicious threat being greater than or equal to a predetermined similarity threshold.

6. The computer-implemented method of claim 1, further comprising:
retrieving, from a data repository, a response protocol associated with the at least one malicious threat, the response protocol including at least one action that prevents or mitigates an impact of the at least on malicious threat; and
generating response data for transmission to the computing device that includes computer-executable instructions to dynamically execute the response protocol on the computing device.

7. The computer-implemented method of claim 1, wherein analyzing the IoC metadata further comprises:
analyzing the IoC metadata relative to non-active historical malicious threats within a historical-threat data repository;
calculating a similarity between the IoC metadata and a non-active historical malicious threat; and
determining that the at least one malicious threat corresponds to a derivative of the non-active historical malicious threat, based at least in part on the similarity.

8. The computer-implemented method of claim 1, further comprising:
performing a threat analysis to determine that the at least one malicious threat is to infiltrate the computing device via service configuration files; and
generating a response protocol to prevent the at least one malicious threat from infiltrating the computing device, the response protocol including preventing client access to the service configuration files, and
wherein, the reporting data further includes the response protocol.

9. One or more non-transitory computer-readable media collectively storing computer-executable instructions that, when executed with one or more processors, collectively cause computers to perform acts comprising:
monitoring, a client interaction of a computing device operating within an enterprise network, the client interaction involving at least one of a change to a systems configuration file or a bypass of a communications channel;
retrieving, from the computing device, Indicator of Compromise (IoC) metadata derived from the client interaction of the computing device on the enterprise network;
analyzing the IoC metadata relative to data records of one or more malicious threats;
identifying at least one malicious threat from the one or more malicious threats, based at least in part on analysis of the IoC metadata;
retrieving a data record associated with the at least one malicious threat, the data record including a first point-in-time that the at least one malicious threat was reported active;
determining, a time-period for which the at least one malicious threat is likely to remain active after the first point-in-time, based at least in part on the data record;
determining a second point-in-time that corresponds to a likely expiration of the at least one malicious threat based at least in part on the first point-in-time and the time-period;
generating a similarity score for the IoC metadata, based at least in part on analysis of the IoC metadata;
performing a mitigation analysis of environmental criteria associated with the computing device using the data record that is maintained until an expiration of the second point-in-time, the environmental criteria including access restrictions of the computing device to the enterprise network;
determining a vulnerability score for the at least one malicious threat, based at least in part on the similarity score and the mitigation analysis; and
generating reporting data that includes at least the vulnerability score for the malicious threat.

10. The one or more non-transitory computer-readable media of claim 9, wherein the acts further comprise:
retrieving, from a third-party data repository, a data-set of one or more malicious threats, based at least in part on the IoC metadata;
determining an additional similarity score for the IoC metadata relative to individual ones of the one or more malicious threats, based at least in part on the IoC metadata;
identifying at least one malicious threat of the one or more malicious threats, based at least in part on the additional similarity score being greater than a predetermined similarity threshold; and
generating an additional vulnerability score for the at least one malicious threat, based at least in part on the environmental criteria associated with the enterprise network, and
wherein, generating the reporting data further includes the additional vulnerability score for the at least one malicious threat, based at least in part on the additional vulnerability score being greater than a predetermined vulnerability threshold.

11. The one or more non-transitory computer-readable media of claim 10, wherein the acts further comprise:
determining an expiration date of the at least one malicious threat, based at least in part on the first point-in-time that the at least one malicious threat was reported active and a time-interval associated with a probable lifecycle of the at least one malicious threat; and
adjusting, within an active-threat data repository, data record for the at least one malicious threat to include the expiration date, wherein the active-threat data repository is configured to store the data record for the at least one malicious threat until the expiration date.

12. The one or more non-transitory computer-readable media of claim 9, wherein the environmental criteria associated with the enterprise network include at least one of a computing device access to a particular domain associated with the one or more malicious threats, computing device access to operating system files within the enterprise network, or computing device capability to bypass a communications network within the enterprise network.

13. The one or more non-transitory computer-readable media of claim 9, wherein the acts further comprise:
determining that the vulnerability score associated with the at least one malicious threat is less than a predetermined vulnerability threshold; and
generating a message to an operator of the enterprise network identifying the at least one malicious threat and a corresponding expiration date, and
wherein, the reporting data further includes the message.

14. The one or more non-transitory computer-readable media of claim 9, wherein the acts further comprise:
retrieving, from a third-party data repository, information associated with at least one malicious threat, the information relating to a tangible impact of at least one malicious threat on the computing device and an availability of one or more actions to prevent or mitigate an impact of the at least one malicious threat on the computing device, and wherein, the vulnerability score for the at least one malicious threat is based at least in part on the information.

15. A system comprising:

one or more processors;

memory coupled to the one or more processors, the memory including one or more modules that are executable by the one or more processors to:

monitor a client interaction, on a computing device operating with an enterprise network, for Indicator of Compromise (IoC) metadata based at least in part on an IoC monitoring list, the client interaction involving at least one of a change to a systems configuration file or a bypass of a communications channel;

analyze the IoC metadata relative to data records of one or more malicious threats;

identify at least one malicious threat of the one or more malicious threats, based at least on the IoC metadata;

retrieve, from a data repository, a data record associated with the at least one malicious threat, the data record including a first point-in-time that the at least one malicious threat was reported active;

determine, a time-period for which the at least one malicious threat is likely to remain active after the first point-in-time, based at least in part on the data record;

determine a second point-in-time that corresponds to a likely expiration of the at least one malicious threat based at least in part on the first point-in-time and the time-period;

perform a mitigation analysis of environmental criteria associated with the computing device using the data record that is maintained until an expiration of the second point-in-time, the environmental criteria including access restrictions of the computing device to the enterprise network;

determine a vulnerability score for the at least one malicious threat that numerically combines a severity of the malicious threat with mitigating environmental criteria, based at least in part on the mitigation analysis; and generate reporting data that includes at least the vulnerability score for the at least one malicious threat.

16. The system of claim 15, wherein the IoC metadata includes a domain name, an Internet Protocol (IP) address, email addresses, an indication of a service configuration change, an indication of a data file being deleted, registry keys, file hashes, or Hyper Text Transfer Protocol (HTTP) user agents.

17. The system of claim 15, wherein the one or more modules are further executable by the one or more processors to:

retrieving, from the data repository, a response protocol to prevent or mitigate an effect of the at least one malicious threat, the response protocol to include quarantining data files associated with the IoC metadata, and wherein the reporting data further includes computer executable instructions that automatically executes the response protocol on the computing device.

18. The system of claim 17, wherein the response protocol further includes computer-executable instructions to prevent client access to service configuration files associated with the computing device.

19. The system of claim 15, wherein the one or more modules are further executable by the one or more processors to:

determine a tangible impact of the at least one malicious threat, based at least in part on the information associated with the at least one malicious threat, the tangible impact including an indication of an estimated loss of data, an estimated loss of access controls, or an estimated rate of disseminating the at least one malicious threat from the computing device to other computing devices within the enterprise network; and identify one or more actions to prevent or mitigate the tangible impact of the at least one malicious threat, and wherein, the vulnerability score is based at least in part on the tangible impact and identification of the one or more actions.

20. The system of claim 15, wherein the one or more modules are further executable by the one or more processors to:

determine a degree of confidence associated with a reliability of an analysis to identify the at least one malicious threat, and wherein, to determine the vulnerability score is further based at least in part on the degree of confidence.

* * * * *